United States Patent
Seon et al.

(10) Patent No.: US 12,177,514 B2
(45) Date of Patent: Dec. 24, 2024

(54) INPUT-BASED STREAMING CONTROL METHOD AND ELECTRONIC DEVICE THEREFOR

(71) Applicant: Samsung Electronics Co., Ltd., Suwon-si (KR)

(72) Inventors: Youngkyu Seon, Suwon-si (KR); Hyesoo Kim, Suwon-si (KR); Hyungki Sung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/155,382

(22) Filed: Jan. 17, 2023

(65) Prior Publication Data

US 2023/0188782 A1 Jun. 15, 2023

Related U.S. Application Data

(63) Continuation of application No. PCT/KR2021/009949, filed on Jul. 30, 2021.

(30) Foreign Application Priority Data

Jul. 30, 2020 (KR) .................. 10-2020-0095266

(51) Int. Cl.
*H04N 21/434* (2011.01)
*H04N 21/43* (2011.01)
(Continued)

(52) U.S. Cl.
CPC ..... *H04N 21/4341* (2013.01); *H04N 21/4305* (2013.01); *H04N 21/436* (2013.01); *H04N 21/47202* (2013.01); *H04N 21/6437* (2013.01)

(58) Field of Classification Search
CPC .......... H04N 21/4341; H04N 21/4305; H04N 21/436; H04N 21/47202; H04N 21/6437
See application file for complete search history.

(56) References Cited

U.S. PATENT DOCUMENTS

| | | |
|---|---|---|
| 7,941,092 B2 | 5/2011 | Rao |
| 7,983,611 B2 | 7/2011 | Rao |

(Continued)

FOREIGN PATENT DOCUMENTS

| | | |
|---|---|---|
| KR | 10-1350754 B1 | 1/2014 |
| KR | 10-2014-0054667 A | 5/2014 |

(Continued)

OTHER PUBLICATIONS

International Search Report dated Nov. 17, 2021, issued in International Application No. PCT/KR2021/009949.

*Primary Examiner* — Mulugeta Mengesha
(74) *Attorney, Agent, or Firm* — Jefferson IP Law, LLP

(57) ABSTRACT

An electronic device is provided. The electronic device includes a wireless communication circuit, at least one processor, and a memory operatively coupled to the at least one processor. The electronic device may be configured to be connected to an external electronic device by using the wireless communication circuit, transmit audio data and video data for reproduction of multimedia in the external electronic device by using the wireless communication circuit, determine whether an input to the multimedia is detected, when the input to the multimedia is detected, transmit information instructing to stop synchronization between the audio data and the video data to the external electronic device.

22 Claims, 13 Drawing Sheets

(51) Int. Cl.
*H04N 21/436* (2011.01)
*H04N 21/472* (2011.01)
*H04N 21/6437* (2011.01)

(56) References Cited

U.S. PATENT DOCUMENTS

| | | |
|---|---|---|
| 8,458,744 B2 | 6/2013 | Dai et al. |
| 9,507,500 B2 | 11/2016 | Wigdor et al. |
| 9,593,854 B2 | 3/2017 | Rasi et al. |
| 9,632,615 B2 | 4/2017 | McCanny et al. |
| 9,830,014 B2 | 11/2017 | McCanny et al. |
| 9,910,533 B2 | 3/2018 | Agarwal et al. |
| 10,135,900 B2 | 11/2018 | Raveendran et al. |
| 10,338,704 B2 | 7/2019 | Coppin et al. |
| 10,419,794 B2 | 9/2019 | Dalbec et al. |
| 2004/0117840 A1 | 6/2004 | Boudreau et al. |
| 2010/0064316 A1 | 3/2010 | Dai et al. |
| 2012/0233644 A1 | 9/2012 | Rao |
| 2013/0003623 A1* | 1/2013 | Raveendran ......... H04L 65/756 370/310 |
| 2013/0087137 A1 | 4/2013 | Rasi et al. |
| 2014/0122599 A1 | 5/2014 | Park et al. |
| 2014/0139456 A1 | 5/2014 | Wigdor et al. |
| 2015/0061970 A1* | 3/2015 | Kim ..................... G06F 3/1423 345/2.3 |
| 2016/0370915 A1 | 12/2016 | Agarwal et al. |
| 2017/0237930 A1* | 8/2017 | Kim ................. H04N 21/43637 348/554 |
| 2017/0374243 A1 | 12/2017 | Trinh |
| 2018/0188832 A1 | 7/2018 | Coppin et al. |
| 2018/0270516 A1 | 9/2018 | Dalbec et al. |
| 2019/0196681 A1 | 6/2019 | Wigdor et al. |
| 2019/0324602 A1 | 10/2019 | Rao |
| 2020/0413120 A1 | 12/2020 | Kim et al. |
| 2021/0409479 A1 | 12/2021 | Rao |
| 2022/0004315 A1* | 1/2022 | Zhang .................. G06F 3/04886 |
| 2022/0253185 A1 | 8/2022 | Wigdor et al. |

FOREIGN PATENT DOCUMENTS

| | | |
|---|---|---|
| KR | 10-1572977 B1 | 12/2015 |
| KR | 10-2017-0096849 A | 8/2017 |
| KR | 10-1915987 B1 | 11/2018 |
| KR | 10-2019-0082578 A | 7/2019 |
| WO | 2015/002586 A1 | 1/2015 |

\* cited by examiner

INPUT-BASED STREAMING CONTROL METHOD AND ELECTRONIC DEVICE THEREFOR

CROSS-REFERENCE TO RELATED APPLICATION(S)

This application is a continuation application, claiming priority under § 365(c), of an International application No. PCT/KR2021/009949, filed on Jul. 30, 2021, which is based on and claims the benefit of a Korean patent application number 10-2020-0095266, filed on Jul. 30, 2020, in the Korean Intellectual Property Office, the disclosure of which is incorporated by reference herein in its entirety.

BACKGROUND

1. Field

The disclosure relates to a method for controlling streaming based on an input and an electronic device for performing the method.

2. Description of Related Art

An electronic device such as a smartphone may provide a communication service with an external electronic device. For example, an electronic device may provide a communication service with a mouse, keyboard, display device, printer, camera, and/or television (TV). As an example, the electronic device may be connected to the TV through wired and/or wireless communication, and may support output of an application executed on the electronic device through the TV. As another example, the electronic device may be connected to a display device connected to a dashboard of a vehicle through wired and/or wireless communication, and may support output of an application executed on the electronic device through the display device.

In this regard, the electronic device may use mirroring or a connected communication link to output an execution screen of an application executed on the electronic device through an external electronic device. For example, the electronic device may support output of an execution screen of an application installed on the electronic device on an external electronic device by executing the corresponding application and transmitting data corresponding to the execution screen of the corresponding application to the external electronic device by using mirroring or a communication link. In this case, the electronic device may configure the execution screen of the application by using resources tailored to the characteristics of the electronic device, for example, the size of the display included in the electronic device, the resolution of the display, and display direction, or the input processing method, among resources (e.g., image files) included in the application.

The above information is presented as background information only to assist with an understanding of the disclosure. No determination has been made, and no assertion is made, as to whether any of the above might be applicable as prior art with regard to the disclosure.

SUMMARY

An electronic device may transmit multimedia data including audio data and/or video data to an external display device. The electronic device may mirror the screen of the electronic device to an external display device by transmitting multimedia data. The electronic device may cause an external display device to output a virtual execution environment by transmitting multimedia data. For example, the electronic device may transmit information about virtual screen (e.g., video data) and virtual audio to the external display device. For example, the electronic device may execute a specified function in response to an input to the virtual execution environment and transmit multimedia data indicating a result of executing the specified function to the external display device.

The external display device may receive the received multimedia data and synchronize audio data and video data of the received multimedia data. For example, the external display device may compare time information (e.g., a time stamp) in the received audio data with time information in the video data, and output the audio data and the video data in synchronization. The external display device may synchronize audio data and video data by buffering the audio data and the video data and comparing the buffered data.

In synchronizing audio data and video data, latency may occur between the electronic device and the external display output device. For example, even if audio data is received first, the external display device may wait until video data corresponding to time information about the audio data is received for synchronization. Conversely, even if video data is received first, the external display device may wait until audio data corresponding to time information about the received video data is received for synchronization. If a user performs the input for the multimedia data that is currently being output, the user may experience input lag due to such a latency. If the user interacts with an application associated with multimedia data, the user's experience may be degraded.

Aspects of the disclosure are to address at least the above-mentioned problems and/or disadvantages and to provide at least the advantages described below. Accordingly, an aspect of the disclosure is to provide an electronic device and a method for controlling streaming based on an input and an electronic device for performing the method.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuit, at least one processor, and a memory operatively connected to the at least one processor, and the memory stores instructions that, when executed, cause the at least one processor to connect to an external electronic device by using the wireless communication circuit, transmit audio data and video data for playing multimedia in the external electronic device by using the wireless communication circuit, determine whether an input for the multimedia is sensed, and transmit, to the external electronic device, information indicating synchronization stop between the audio data and the video data if the input for the multimedia is sensed.

In accordance with another aspect of the disclosure, a method for controlling synchronization of an electronic device is provided. The method includes connecting to an external electronic device, transmitting audio data and video data for playing multimedia in the external electronic device to the external electronic device, and controlling synchronization of the external electronic device during transmission of the audio data and the video data, and the controlling of the synchronization includes determining whether an input for the multimedia is sensed and transmitting, to the external electronic device, information indicating synchronization stop between the audio data and the video data if the input for the multimedia is sensed.

According to various embodiments disclosed herein, the electronic device may reduce end-to-end latency by controlling synchronization based on an input.

The electronic device according to an embodiment disclosed herein may reduce an input latency by reducing an end-to-end latency.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
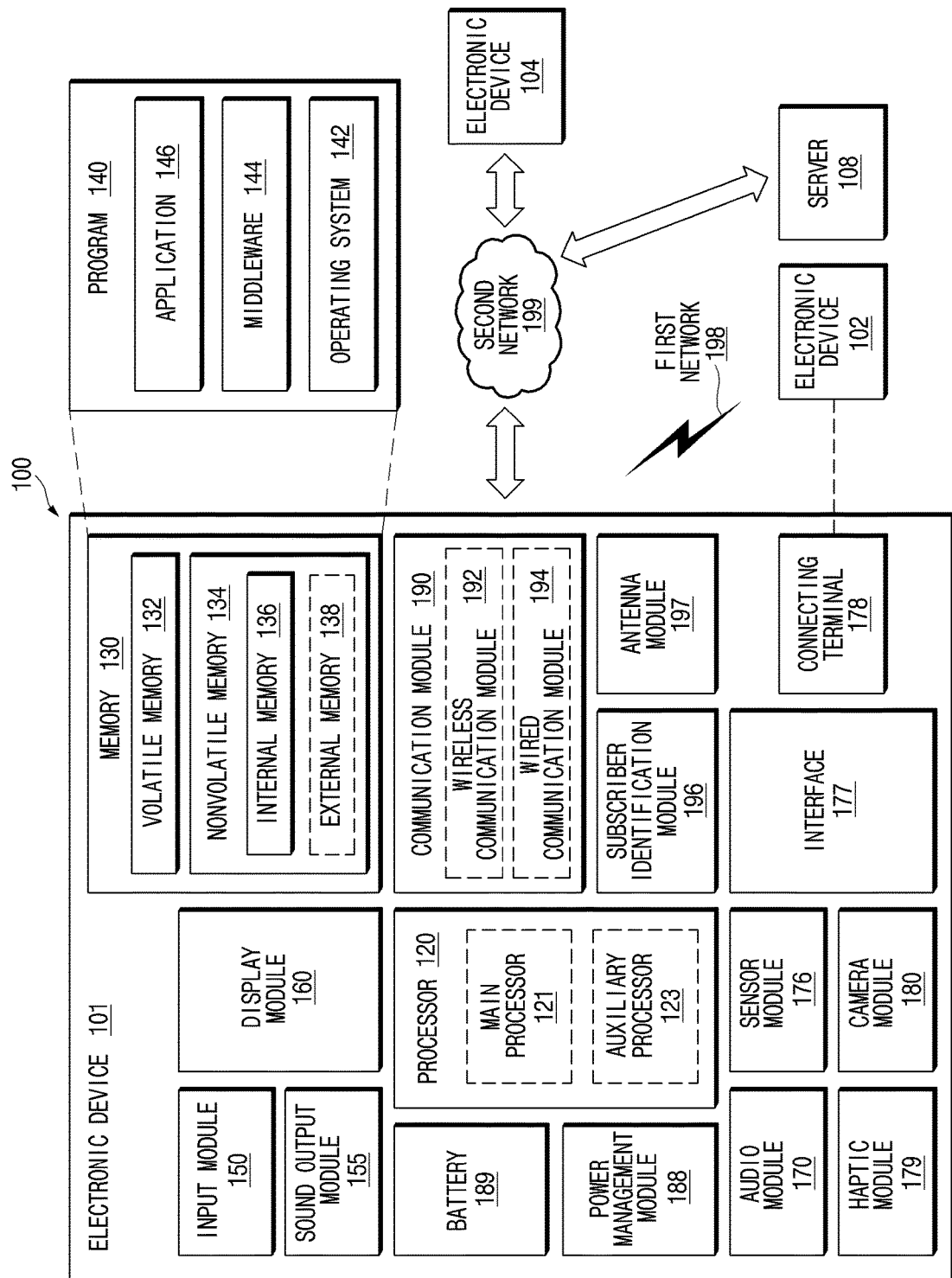
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123

(e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
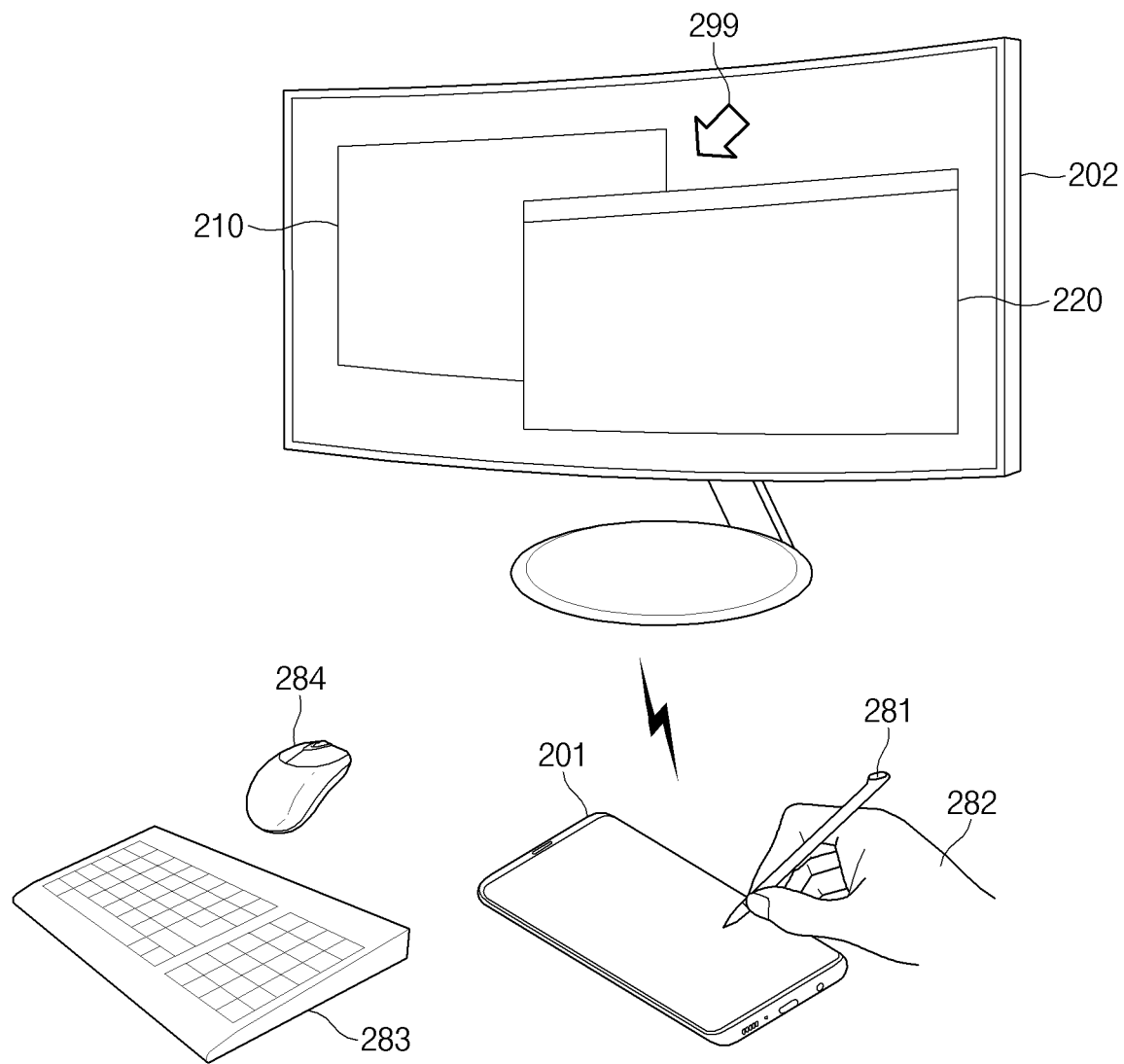
FIG. 2 is a diagram illustrating an input receiving environment of an electronic device according to an embodiment of the disclosure.

FIG. 2 is a diagram illustrating an input receiving environment of an electronic device according to an embodiment of the disclosure.

Referring to FIG. 2, an electronic device 201 (e.g., the electronic device 101 of FIG. 1) may communicate with an external electronic device 202. The electronic device 201 may be a source device which may be configured to transmit multimedia data to at least one client device (e.g., the external electronic device 202). The electronic device 201 may be configured to transmit multimedia data to the external electronic device 202 through a wired connection and/or a wireless connection. For example, the wireless connection may be based on a short-range wireless protocol (e.g., a Wi-Fi based protocol).

The external electronic device 202 is an electronic device including a display and may display received multimedia data on the display. The external electronic device 202 may output audio data and/or video data included in multimedia data. The external electronic device 202 may perform synchronized output of audio data and video data.

The electronic device 201 may transmit multimedia data to mirror the screen of the electronic device 201 to the external electronic device 202 or to provide a virtual execution environment to the external electronic device 202. For example, a screen (e.g., a mirroring screen and/or a virtual execution environment) displayed on the external electronic device 202 may include an execution screen of at least one application. Multimedia data may include the execution screen of the at least one application. In the example of FIG. 2, the external electronic device 202 may display a first window 210 and a second window 220. For example, the first window 210 may correspond to an execution screen of a first application executed on the electronic device 201, and the second window 220 may correspond to an execution screen of a second application executed on the electronic device 201.

The user of the electronic device 201 may interact with the screen displayed on the external electronic device 202. The user may perform an arbitrary input for interaction. The electronic device 201 may acquire a user input by using various methods.

For example, the electronic device 201 may acquire a user input from an input to the electronic device 201. A touch input by a hand 282 to the electronic device 201 may be the user input. An input using a stylus 281 to the electronic device 201 may be the user input. An input through an external input device (e.g., a human interface device such as a keyboard 283 and/or a mouse 284) connected to the electronic device 201 by wire or wirelessly may be the user input. In an example, the electronic device 201 may operate as a trackpad for the execution screen displayed on the external electronic device 202. In an example, the electronic device 201 may display an input interface (e.g., a keyboard interface) and acquire the user input from an input to the input interface.

For example, the electronic device 201 may acquire the user input from an input to the external electronic device 202. For example, the external electronic device 202 may be connected to at least one input device (e.g., the keyboard 283, the mouse 284, and/or a remote controller (not shown)) by wire and/or wirelessly. If an input is received from at least one input device, the external electronic device 202 may transmit information on the user input to the electronic device 201. The electronic device 201 may acquire the user input by receiving information on the user input from the external electronic device 202.

The electronic device 201 may execute a specified function based on the user input and transmit multimedia data corresponding to the execution of the specified function to the external electronic device 202. For example, if the user input corresponds to the movement of a pointer 299, the electronic device 201 may transmit multimedia data corresponding to the movement of the pointer 299 to the external electronic device 202. The user may acquire visual feedback corresponding to his or her input by visually confirming the movement of the pointer 299 through the external electronic device 202.

The external electronic device 202 may perform synchronization of audio data and video data included in the multimedia data. For example, the external electronic device 202 may generate a buffer (e.g., a jitter buffer) for synchronization and may synchronize audio data and video data by comparing time information (e.g., a time stamp) of audio data and video data stored in the buffer. If synchronization of audio data and video data is performed, the end-to-end latency may be increased due to synchronization. In the disclosure below, the electronic device 201 may improve user experience by controlling synchronization of the external electronic device 202 based on the user input.

Figure 3:
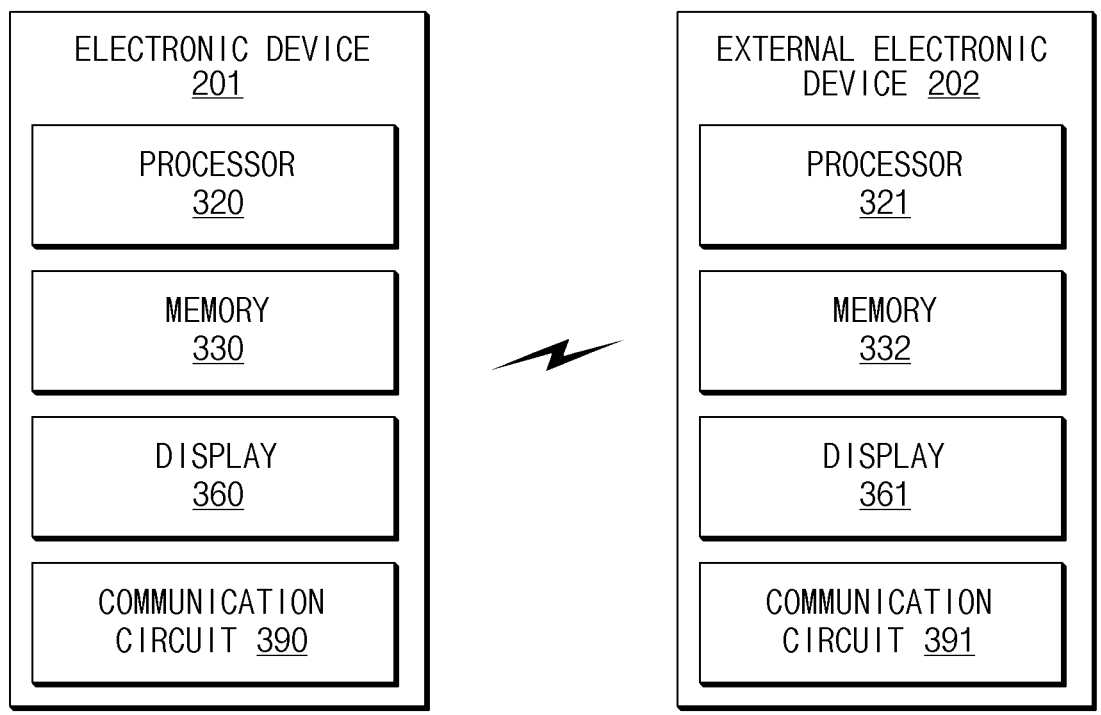
FIG. 3 is a diagram illustrating structures of an electronic device and an external electronic device according to an embodiment of the disclosure.

FIG. 3 is a diagram illustrating structures of an electronic device and an external electronic device according to an embodiment of the disclosure.

Referring to FIG. 3, an electronic device 201 may include a processor 320 (e.g., the processor 120 of FIG. 1), a memory 330 (e.g., the memory 130 of FIG. 1), a display 360 (the display module 160 of FIG. 1), and/or a communication circuit 390 (e.g., the communication module 190 of FIG. 1). The processor 320 may be operatively connected to other components of the electronic device 201 and may control various operations of the electronic device 201. The processor 320 may perform various operations of the electronic device 201 by executing one or more instructions stored in the memory 330. Hereinafter, operations described as being performed by the electronic device 201 may be referred to as being performed by the processor 320. The memory 330 may be operatively connected to at least the processor 320 and may store instructions. The memory 330 may store various types of information. For example, the memory 330 may store information (e.g., Bluetooth address information) about the external electronic device 202 for sharing multimedia data with the electronic device 201. The communication circuit 390 may support communication based on a plurality of communication protocols. For example, the plurality of communication protocols may include Bluetooth (e.g., Bluetooth legacy and/or Bluetooth low energy), Wi-Fi (e.g., Wi-Fi Direct), near field communication (NFC), and/or cellular communication.

The external electronic device 202 may include a processor 321 (e.g., the processor 120 of FIG. 1), a memory 331 (e.g., the memory 130 of FIG. 1), a display 361 (e.g., the display module 160 of FIG. 1), and/or a communication circuit 391 (e.g., the communication module 190 of FIG. 1). The external electronic device 202, as a device separate from the electronic device 201, may be a device configured to output multimedia data. The processor 321 may perform various operations of the external electronic device 202 by executing one or more instructions stored in the memory 331. Hereinafter, operations described as being performed by the external electronic device 202 may be referred to as being performed by the processor 321. The memory 331 may be operatively connected to at least the processor 321 and may store instructions. The memory 332 may store various types of information. For example, the memory 332 may store identification information about the electronic device 201. The display 360 may be operatively connected to the processor 320 and may visually display information according to a control command of the processor 320. The display 360 may receive or provide at least one piece of information from or to the user. For example, the display 360 may receive or provide information for mirroring and/or provision of a virtual execution environment from or to the user. The communication circuit 390 may support communication based on a plurality of communication protocols. For example, the plurality of communication protocols may include Bluetooth (e.g., Bluetooth legacy and/or Bluetooth low energy), Wi-Fi (e.g., Wi-Fi Direct), near field communication (NFC), and/or cellular communication.

The electronic device 201 may be connected to the external electronic device 202 by using the communication circuit 390. The electronic device 201 may recognize the external electronic device 202 by transmitting a scanning signal and receiving a response signal thereto by using the communication circuit 390. The electronic device 201 may store information associated with the external electronic device 202 included in the response signal (e.g., address information associated with the external electronic device 202) in the memory 330. The electronic device 201 may transmit a connection request including an identifier of the electronic device 201 to the external electronic device 202 and may connect to the external electronic device 202 based on a response of the connection request. For example, the identifier of the electronic device 201 may be a unique identifier of the electronic device 201 associated with an application for sharing multimedia data (e.g., Samsung Dex). The electronic device 201 may transmit multimedia data to the external electronic device 202 after connecting to the external electronic device 202.

The external electronic device 202 may be connected to the electronic device 201 by using the communication circuit 391. The external electronic device 202 may transmit a signal based on a second protocol (e.g., Bluetooth protocol) based on a user input, and may receive a response signal based on the second protocol from the electronic device 201, thereby recognizing the electronic device 201. In an example, if the signal based on the second protocol is received from the external electronic device 202, the electronic device 201 may compare information (e.g., address) associated with the external electronic device 202 with information stored in the memory 330, and may transmit the response signal if the electronic device 201 has ever been connected to the external electronic device 202. The external electronic device 202 may provide information about the recognized electronic device 201 to the display 361 and may transmit a message based on the second protocol to the electronic device 201 based on a user input. For example, the message may include information for connection based on the first protocol (e.g., Wi-Fi protocol). After connecting to the electronic device 201, the external electronic device 202 may receive multimedia data from the electronic device 201 and output the received multimedia data.

The electronic device 201 may control video and audio synchronization of the external electronic device 202 based on a user input. As described above with reference to FIG. 2, the electronic device 201 may acquire a user input from an input to the electronic device 201 or the external electronic device 202. For example, if a user input is sensed while sharing multimedia data with the external electronic device 202, the electronic device 201 may transmit, to the external electronic device 202, a signal indicating that the external electronic device 202 is to stop synchronization. If the external electronic device 202 stops synchronization, the end-to-end latency between the electronic device 201 and the external electronic device 202 may be reduced by about 50%. The user may hardly experience the input lag by immediately confirming visual feedback for the user input through the external electronic device 202. After transmitting the signal of synchronization stop, the electronic device 201 may transmit, to the external electronic device 202, a signal indicating synchronization resumption if no input is sensed within a specified time from the last sensed input.

The memory 330 may store instructions that, when executed, cause the processor 320 to perform operations to be described below. The instructions, when executed, may cause the processor 320 to connect to the external electronic device 202 by using the communication circuit 390, transmit audio data and video data for playing multimedia in the external electronic device 202 by using the communication circuit 390, determine whether an input for the multimedia is sensed, and transmit, to the external electronic device 202, information indicating synchronization stop between the audio data and the video data if the input for the multimedia is sensed. For example, the multimedia may correspond to mirroring of a display screen of the electronic device or a virtual execution environment provided by the electronic device. The input for the multimedia may include an input for the mirrored execution environment of the electronic device 201 or an input for the virtual execution environment.

The instructions, when executed, may cause the processor 320 to sense the input for the multimedia based on an input for the electronic device 201 or an input for the external electronic device 202.

The instructions, when executed, may cause the processor 320 to start a timer if the input for the multimedia is sensed. The instructions, when executed, may cause the processor 320 to restart the timer if a subsequent input for the multimedia is sensed while the timer is running, and transmit, to the external electronic device, a signal indicating synchronization resumption between the audio data and the video data if the timer expires.

The instructions, when executed, may cause the processor to receive a first advertisement signal based on a second protocol from the external electronic device 202, and transmit a second advertisement signal corresponding to the first advertisement signal if an address of the external electronic device indicated by the first advertisement signal corresponds to an address stored in the memory. The instructions, when executed, may cause the processor 320 to connect to the external electronic device 202 using a first protocol by the communication circuit 390 if a connection request is received from the external electronic device by using the second protocol.

The instructions, when executed, may cause the processor 320 to transmit the audio data and the video data based on a real-time transport protocol (RTP). Each of the audio data and the video data may include time information in a header.

The components of the electronic device 201 and the external electronic device 202 illustrated in FIG. 3 are exemplary, and examples of the disclosure are not limited thereto. For example, the electronic device 201 and/or the external electronic device 202 may further include a component not illustrated in FIG. 3.

Figure 4:
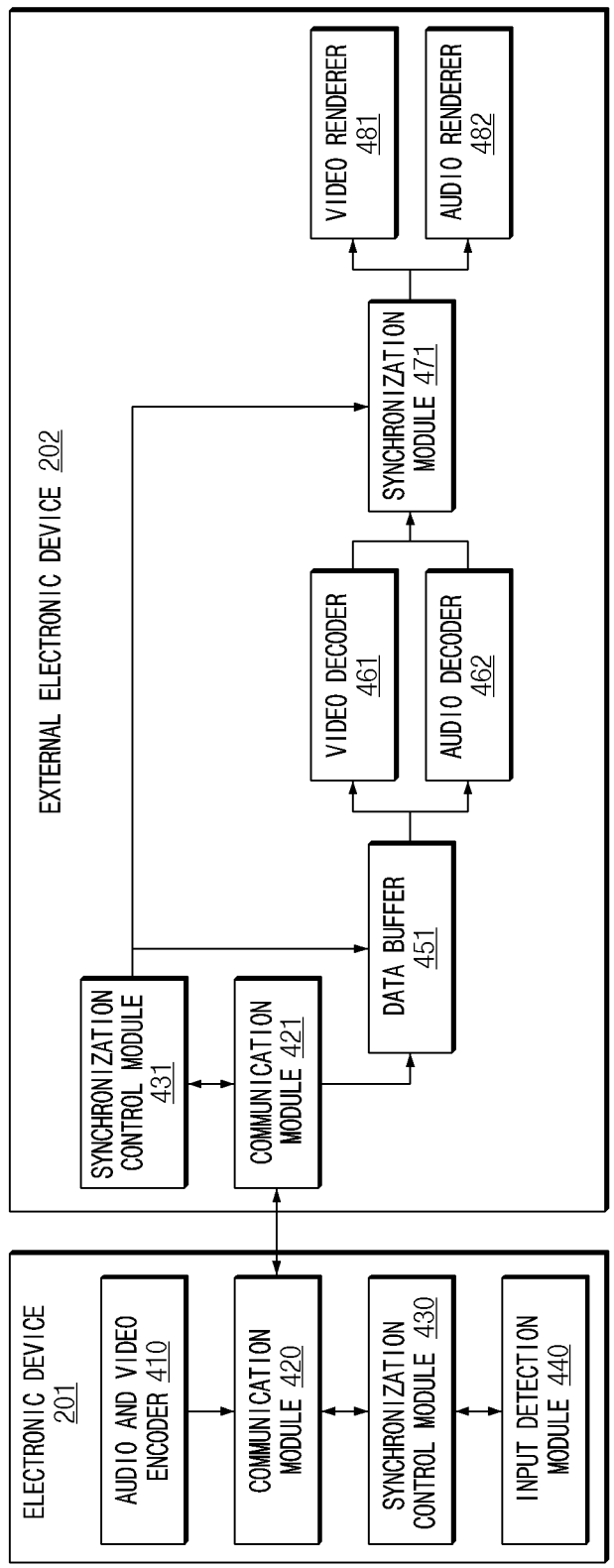
FIG. 4 is a block diagram of an electronic device and an external electronic device according to an embodiment of the disclosure.

FIG. 4 is a block diagram of an electronic device and an external electronic device according to an embodiment of the disclosure.

Referring to FIG. 4, components of the electronic device 201 and the external electronic device 202 shown in FIG. 4 may be, for example, software modules. For another example, at least some of the components may be modules implemented in terms of hardware.

In an example, the electronic device 201 may include an audio and video encoder 410 (hereinafter referred to as an encoder 410), a communication module 420, a synchronization control module 430, and/or an input detection module 440.

The encoder 410 may encode multimedia data to be shared with the external electronic device 202 according to a specified audio codec and/or video codec. The encoder 410 may transfer encoded multimedia data to the communication module 420.

The communication module 420 may transmit, to the external electronic device 202, multimedia data encoded according to a specified protocol (e.g., real-time transport protocol). For example, the communication module 420 may packetize video data and audio data according to the specified protocol and transmit the packetized data to the external electronic device 202 through a network interface. The communication module 420 may include time information (e.g., a time stamp) indicating a sampling time in a packet header.

The input detection module 440 may detect a user input associated with currently shared multimedia data. For example, the user input may be an input that causes a visual change in shared multimedia data. For the user input unrelated to currently shared multimedia data, the input detection module 440 may ignore the corresponding user input. As described above with reference to FIG. 2, the input detection module 440 may detect a user input from an input for the electronic device 201, an external input device, or an external electronic device 202. If the user input is detected, the input detection module 440 may transfer information or a signal indicating detection of the user input to the synchronization control module 430.

The synchronization control module 430 may control synchronization of the external electronic device 202. For example, the synchronization control module 430 may transmit, to the external electronic device 202, a signal indicating synchronization stop by using the communication module 420 if the information or a signal indicating detection of the user input is received. The synchronization control module 430 may start a timer having a specified time length after transmitting the signal indicating synchronization stop. The synchronization control module 430 may be configured to update the timer whenever an input is detected. If the timer expires, the synchronization control module 430 may transmit a signal indicating synchronization resumption to the external electronic device 202 by using the communication module 420.

The communication module 421 may receive a signal from the electronic device 201. The communication module 421 may transfer multimedia data received from the electronic device 201 to a data buffer 451. The data buffer 451 (e.g., a jitter buffer) may store received multimedia data as much as a specified size. A video decoder 461 may decode video data for the data buffer 451, and an audio decoder 462 may decode audio data for the data buffer 451.

A synchronization module 471 may compare time information (e.g., a time stamp) about video data and audio data in the data buffer 451 and synchronize the video data and audio data based on the time information. The synchronization module 471 may synchronize audio data and video data by simultaneously outputting audio data and video data having time information corresponding to each other. The synchronization module 471 may transfer the synchronized video data and audio data to a video renderer 481 and an audio renderer 482, respectively. The video renderer 481 may output video data by rendering the received video data, and the audio renderer 482 may output audio data by rendering the audio data.

The synchronization control module 431 may control synchronization of audio data and video data for the external electronic device 202. Upon starting the connection of the electronic device 201, the synchronization control module 431 may start synchronization of audio data and video data. Upon receiving a signal indicating synchronization stop from the electronic device 201, the synchronization control module 431 may sequentially output audio data and video data stored in the data buffer 451 without synchronizing the audio data and video data. Upon receiving a signal indicating synchronization resumption from the electronic device 201, the synchronization control module 431 may cause the synchronization module 471 to synchronize video data and audio data.

Figure 5:
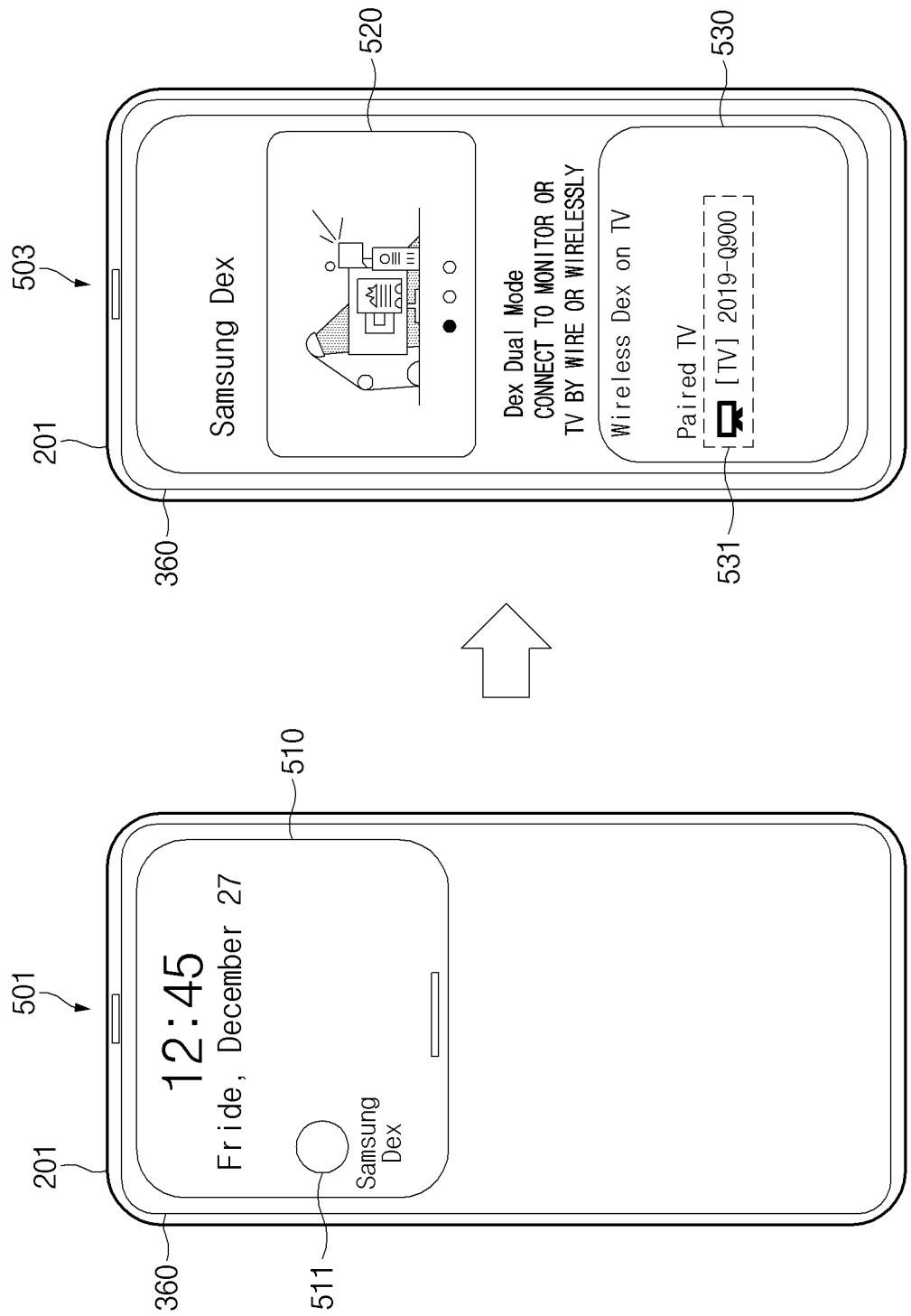
FIG. 5 is a view illustrating a user interface for connection of an external electronic device by an electronic device according to an embodiment of the disclosure.

FIG. 5 is a view illustrating a user interface for connection of an external electronic device by an electronic device according to an embodiment of the disclosure.

Referring to FIG. 5, referring to a reference numeral 501, according to an example, the electronic device 201 may display a control user interface (UI) 510 for controlling functions of the electronic device 201 on the display 360. The control UI 510 may include a sharing menu 511 for activating a function or application for sharing multimedia data (e.g., mirroring and/or providing the virtual execution environment). Based on a user input for the sharing menu 511, the electronic device 201 may provide a sharing UI (e.g., UI of reference number 503) for sharing multimedia data through the display 360.

Referring to a reference numeral 503, the electronic device 201 may provide a guide UI 520 and an external electronic device list 530. The guide UI 520 may include, for example, guide information on a function or application for sharing multimedia data. The external electronic device list 530 may include information 531 about external electronic devices recognized by the electronic device 201. For example, the electronic device 201 may display, in the external electronic device list 530, only information about external electronic devices to which the electronic device 201 has ever been connected among recognized external electronic devices. Based on a selection input for one of the external electronic devices displayed in the external electronic device list 530, the electronic device 201 may connect to the selected external electronic device.

The electronic device 201 disclosed in FIG. 5 has a bar-type or plate-type appearance, but the disclosure is not limited thereto. For example, the illustrated electronic device 201 may be a part of a rollable electronic device or a foldable electronic device. The "rollable electronic device" may refer to an electronic device in which a display (e.g., the display 360 of FIG. 3) is capable of being bended and deformed, making it possible for at least a portion to be wound or rolled or accommodated in a housing (not shown). The rollable electronic device may be used by expanding a screen display region by unfolding the display or exposing a larger area of the display to the outside depending on the needs of the user. The "foldable electronic device" may refer to an electronic device capable of being folded so that two different regions of a display are faced with each other or in directions opposite to each other. In general, for the foldable electronic device, in a portable state, the display is folded so that two different regions are faced with each other or in the directions opposite to each other, and in actual use, the user may unfold the display so that the two different regions take a substantially flat panel shape. In some embodiments of the disclosure, the electronic device 201 according to various embodiments disclosed herein may be interpreted as meaning including not only portable electronic devices such as smartphones, but also various other electronic devices such as laptop computers and home appliances.

Figure 6:
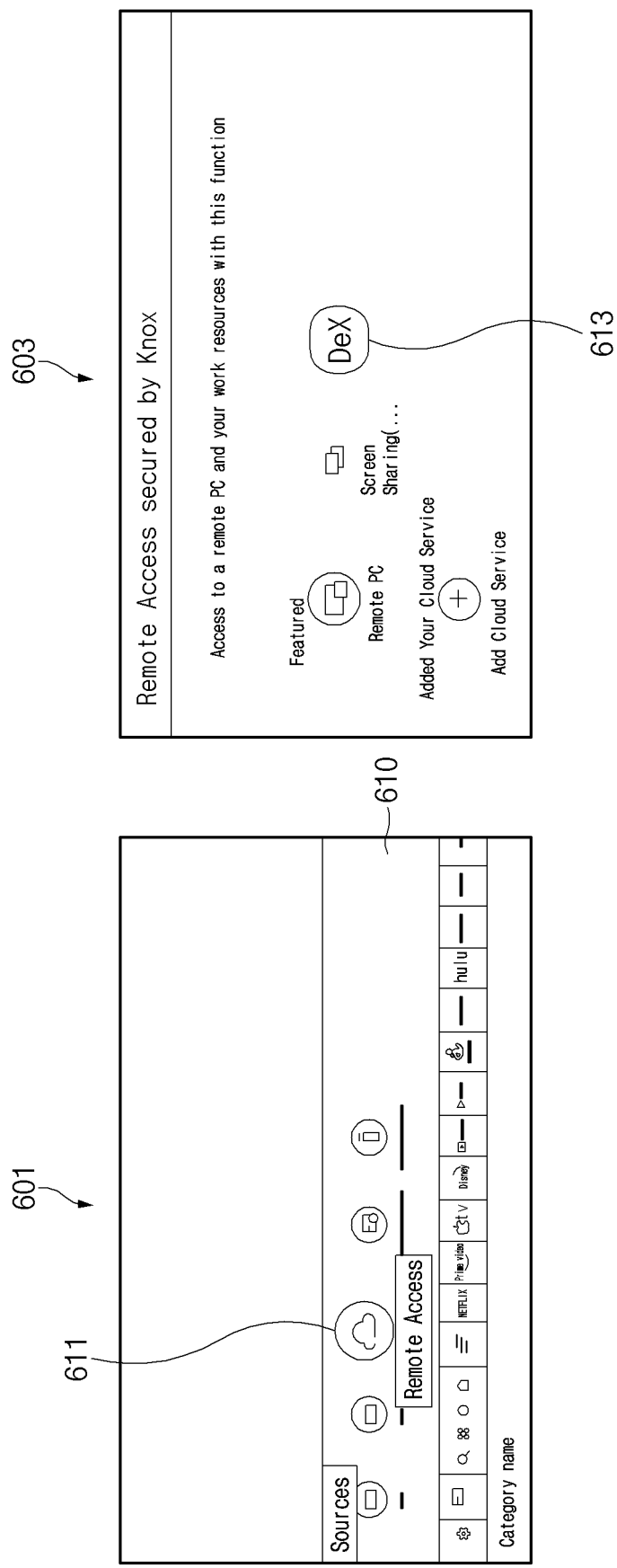
FIG. 6 a view illustrating a user interface for connection of an electronic device by an external electronic device according to an embodiment of the disclosure.

FIG. 6 a view illustrating a user interface for connection of an electronic device by an external electronic device according to an embodiment of the disclosure.

Referring to FIG. 6, referring to a reference numeral 601, for example, the external electronic device 202 may display a selection UI 610 for selecting a remote access source device of the external electronic device 202 on the display 361. For example, the selection UI 610 may include a remote access menu 611 for remote access. Based on the user input for the remote access menu 611, the external electronic device 202 may provide a UI (e.g., UI of reference number 603) for selecting the remote access source device.

Figure 7:
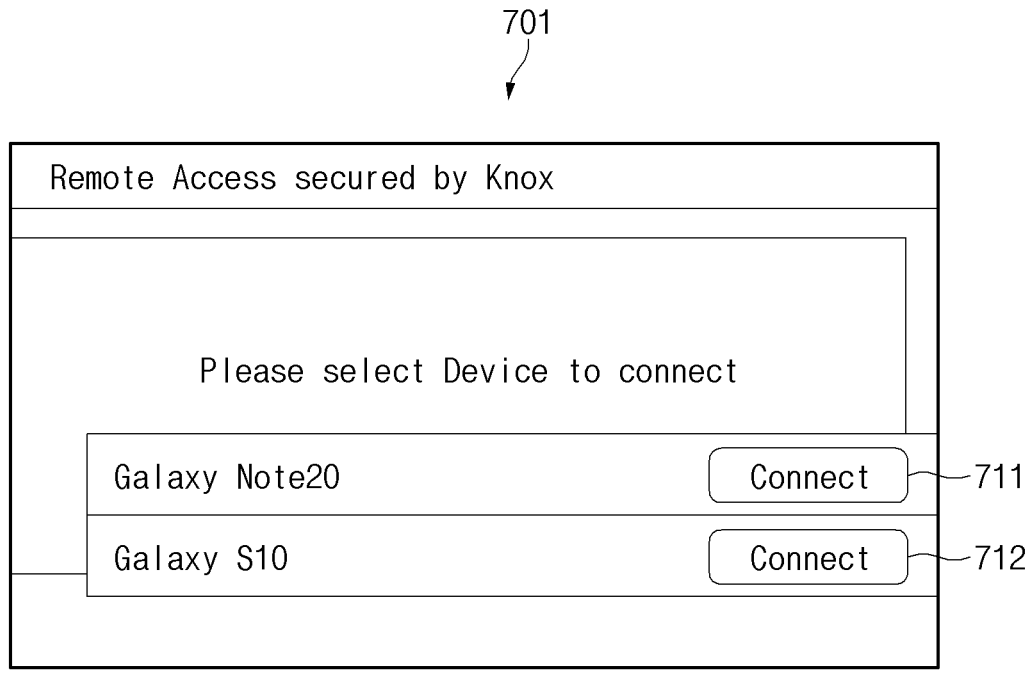
FIG. 7 a view illustrating a user interface for connection of an electronic device by an external electronic device according to an embodiment of the disclosure.

Referring to a reference numeral 603, the external electronic device 202 may display a list of remote access source devices. When an input for a specified mirroring and/or virtual environment provision menu 613 from the list of remote access sources is received, the external electronic device 202 may display a UI as shown in FIG. 7. The mirroring and/or virtual environment provision menu 613 may be a user interface for providing a function of sharing multimedia data to mirror the screen of a remote access source device (e.g., the electronic device 201 of FIG. 2 or FIG. 3) to the external electronic device 202 or to provide a virtual execution environment to the external electronic device 202. Multimedia data may include video data and audio data corresponding to a virtual execution environment or mirroring.

FIG. 7 a view illustrating a user interface for connection of an electronic device by an external electronic device according to an embodiment of the disclosure.

Referring to FIG. 7, referring to a reference numeral 701, the external electronic device 202 may display a list of recognized remote access source devices. In the example of FIG. 7, the external electronic device 202 may display information about a first source device (e.g., Galaxy Note 20) and a second source device (e.g., Galaxy S10). When an input for a connection menu 711 to the first source device is received, the external electronic device 202 may attempt to connect to the first source device. When an input for a connection menu 712 to the second source device is received, the external electronic device 202 may attempt to connect to the second source device.

Figure 8:
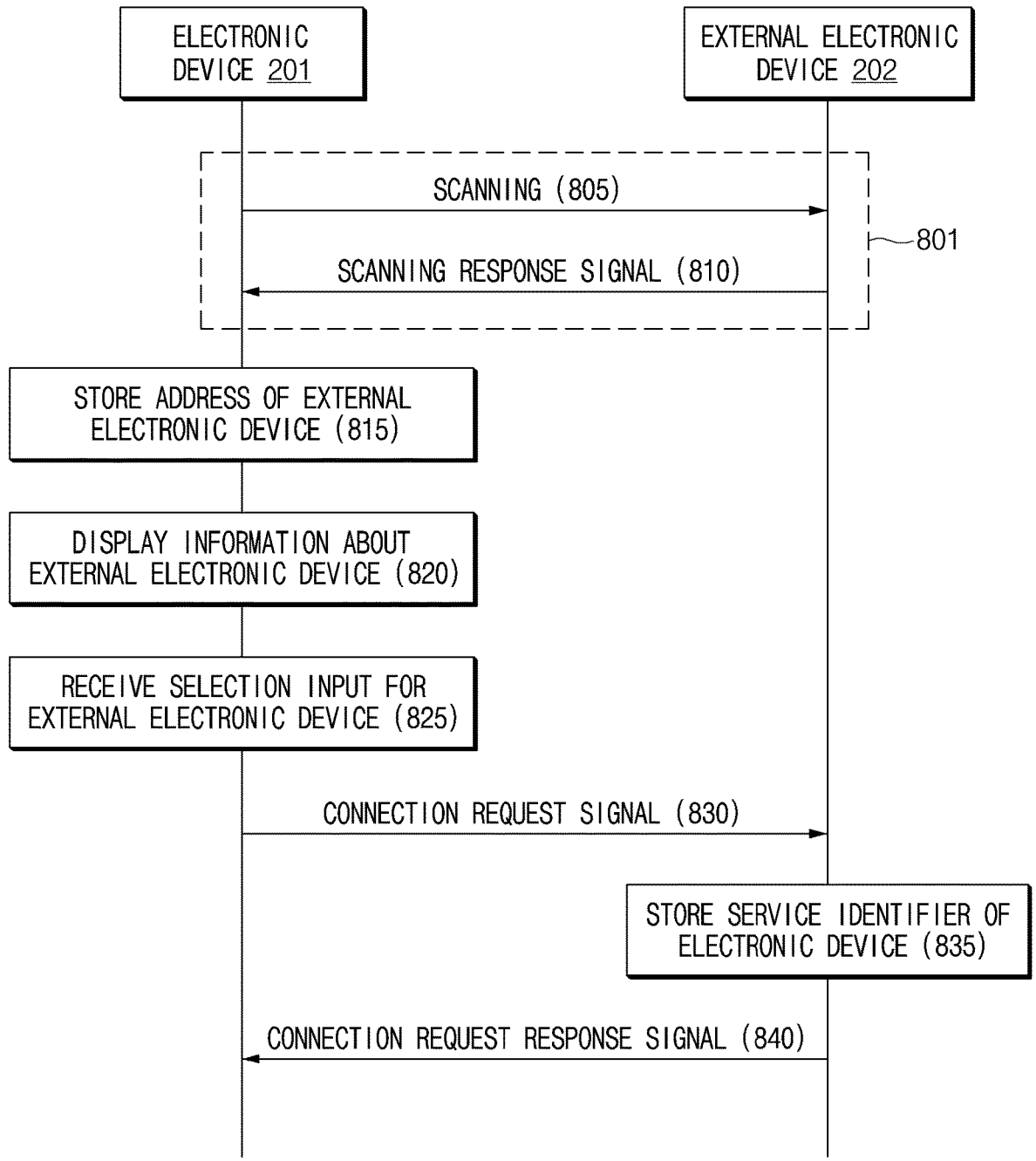
FIG. 8 is a signal flow diagram of a method for connecting an electronic device and an external electronic device according to an embodiment of the disclosure.

FIG. 8 is a signal flow diagram of a method for connecting an electronic device and an external electronic device according to an embodiment of the disclosure.

Referring to FIG. 8, it may be performed by a processor (e.g., the processor 120 of FIG. 1 or the processor 320 of FIG. 3) of an electronic device (e.g., the electronic device 101 of FIG. 1 or the electronic device 201 of FIGS. 2 and 3) and a processor (e.g., the processor 321 of FIG. 3) of an external electronic device (e.g., the external electronic device 202 of FIG. 3).

In operation 805, the electronic device 201 may transmit (e.g., broadcast) a scanning signal. For example, the electronic device 201 may transmit a scanning signal based on a first protocol (e.g., Wi-Fi or Wi-Fi Direct). In an example, the electronic device 201 may transmit a scanning signal based on the input for the menu 511 of FIG. 5.

In operation 810, the external electronic device 202 may transmit a scanning response signal to the received scanning signal. In an example, the scanning response signal may include information about the external electronic device 202. The information about the external electronic device 202 may include, for example, a Bluetooth media access control (MAC) address. The information about the external electronic device 202 may further include a MAC address (e.g., Wi-Fi MAC address, Bluetooth MAC address, and/or BLE MAC address), name, and/or icon information about the external electronic device 202. The electronic device 201 may store the received information about the external electronic device 202 in a memory (e.g., the memory 330 of FIG. 3). For example, in operation 815, the electronic device 201 may store the address of the external electronic device 202. Through operations 805 and 810, the electronic device 201 may acquire information (e.g., MAC address, name, and/or icon information) about the external electronic device 202. Operations 805 and 810 may be referred to as provisioning 801.

In operation 820, the electronic device 201 may display information about the external electronic device 202. For example, the electronic device 201 may display a list (e.g., the external electronic device list 530 of FIG. 5) of the external electronic devices 202 receiving a response signal on a display (e.g., the display 360 of FIG. 3).

In operation 825, the electronic device 201 may receive an input for selecting the external electronic device 202 from the list of external electronic devices. In operation 830, based on the selection input for the external electronic device 202, the electronic device 201 may transmit a connection request signal to the external electronic device 202. The electronic device 201 may generate unique identifier information for providing a mirroring screen and/or a virtual execution environment related to the electronic device 201 based on the selection input for the external electronic device 202. The connection request signal may include unique identifier information about the electronic device 201. For example, the unique identifier information may be an identifier of the electronic device 201 associated with an application for providing mirroring and/or the virtual execution environment. The external electronic device 202 may store unique identifier information about the electronic device 201 in a memory (e.g., the memory 332 of FIG. 3) based on the received connection request signal. For example, in operation 835, the external electronic device 202 may store unique identifier information about the electronic device 201. The unique identifier information about the electronic device 201 may be information for displaying (e.g., referring to the UI of reference number 701) information related to the electronic device 201 in the external electronic device 202 if there is a history of the external electronic device 202 and the electronic device 201 being previously connected. In operation 840, the electronic device 201 may receive a connection request response signal from the external electronic device 202. The electronic device 201 may generate a connection based on the first protocol based on the connection request response signal and transmit multimedia data to the external electronic device 202.

In the above-described operations, as necessary, at least one operation may be omitted or added, and the order of operations may be changed.

Figure 9:
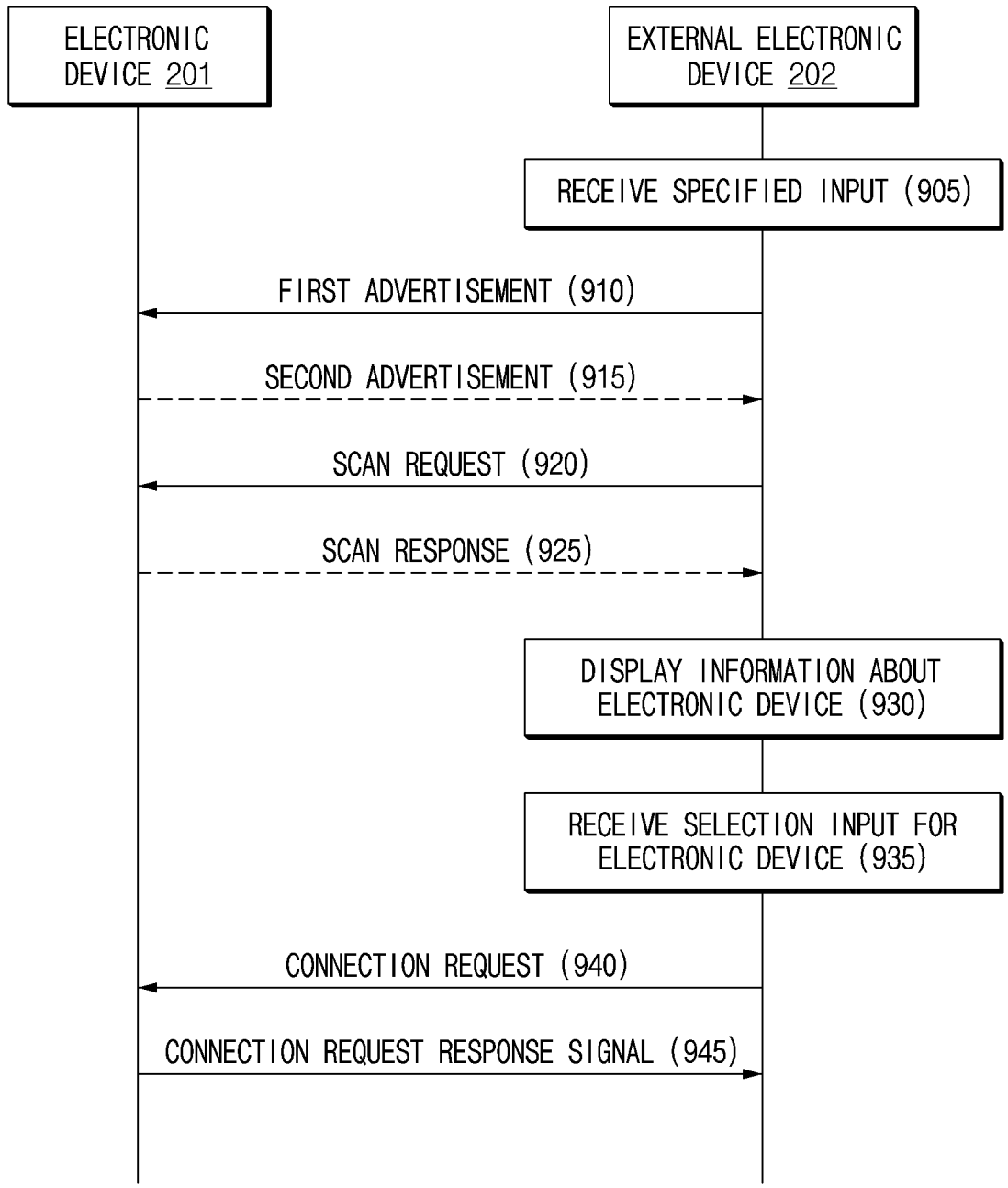
FIG. 9 is a flowchart of a method for connecting an external electronic device and an electronic device according to an embodiment of the disclosure.

FIG. 9 is a flowchart of a method for connecting an external electronic device and an electronic device according to an embodiment of the disclosure.

Referring to FIG. 9, it may be performed by a processor (e.g., the processor 120 of FIG. 1 or the processor 320 of FIG. 3) of an electronic device (e.g., the electronic device 101 of FIG. 1 or the electronic device 201 of FIGS. 2 and 3) and a processor (e.g., the processor 321 of FIG. 3) of an external electronic device (e.g., the external electronic device 202 of FIG. 3).

In the example of FIG. 9, it may be assumed that the external electronic device 202 and the electronic device 201 are connected at least once according to the method for connecting in FIG. 8. For example, it may be assumed that the external electronic device 202 and the electronic device 201 have performed provisioning (e.g., 801 of FIG. 8) at least once. The electronic device 201 may store information (e.g., MAC address, icon information, and/or name) about the external electronic device 202.

In operation 905, the external electronic device 202 may receive a specified input. For example, the specified input may be an input for activating a remote access function of the external electronic device 202. The external electronic device 202 may receive the input for the menu 613 of FIG. 6 as a specified input.

In operation 910, the external electronic device 202 may transmit (e.g., broadcast) a first advertisement based on a second protocol (e.g., Bluetooth or Bluetooth Low Energy) when the specified input is received. The first advertisement may include information indicating that sharing of multimedia data by the external electronic device 202 (e.g., mirroring and/or providing a virtual environment) is possible.

In operation 915, the electronic device 201 may transmit a second advertisement based on the second protocol in response to receiving the first advertisement. For example, the second advertisement may store unique identifier information about the electronic device 201. In an example, the electronic device 201 may be configured to acquire address information about the external electronic device 202 from the received first advertisement and transmit the second advertisement only if the acquired address information about the external electronic device 202 corresponds to (matches) the information stored in the electronic device 201. If the received first advertisement includes information (e.g., MAC address) about the external electronic device that is not stored in the electronic device 201, the electronic device 201 may not transmit the second advertisement. For example, the electronic device 201 may receive an advertisement from an external electronic device unrelated to the user (e.g., a television of a neighbor's house). In this case, in order to prevent unintentional connection, the electronic device 201 may ignore advertisements of external electronic devices that do not have information. For example, an attacker may attempt to hack the electronic device 201 by transmitting an advertisement. The electronic device 201 may defend against external attacks by ignoring advertisements of external electronic devices that do not have information.

In operation 920, the external electronic device 202 may transmit a scan request to the electronic device 201 based on the second protocol. In operation 925, the electronic device 201 may transmit a scan response to the external electronic device 202.

In operation 930, the external electronic device 202 may display the received information about the electronic device 201. For example, the external electronic device 202 may display the information about the electronic device 201 in the list of external source devices described above with reference to FIG. 7, based on the unique identifier information about the electronic device 201 described above in connection with operation 835 of FIG. 8.

In operation 935, the external electronic device 202 may receive a selection input of the electronic device 201. In response to receiving the selection input, in operation 940, the external electronic device 202 may transmit a connection request to the electronic device 201. For example, the connection request may be transmitted based on the second protocol and may include information for connection based on the first protocol (e.g., the first protocol associated address of the external electronic device 202). In operation 945, the electronic device 201 may transmit a connection request response signal to the external electronic device 202. After receiving the connection request response signal, the electronic device 201 and the external electronic device 202 may establish a connection based on the first protocol and share multimedia data through the established connection.

In the example of FIG. 9, if a function related to the second protocol of the electronic device 201 is deactivated, the electronic device 201 may not be able to receive the first advertisement. For example, the electronic device 201 may exceptionally keep the function of the second protocol activated even in a mode in which the function of the second protocol is deactivated (e.g., airplane mode, kids mode, and safety mode).

In the above-described operations, as necessary, at least one operation may be omitted or added, and the order of operations may be changed.

Figure 10:
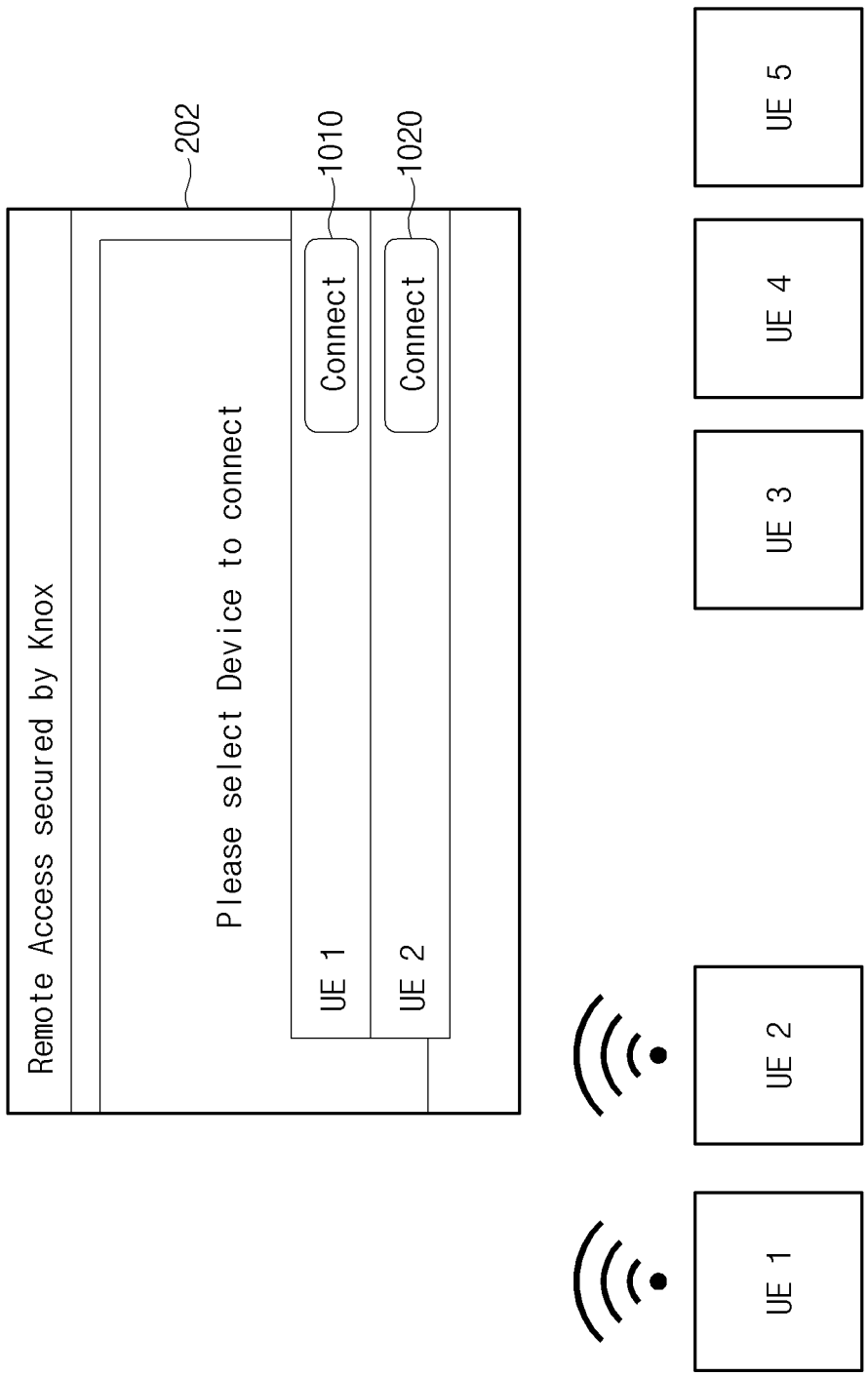
FIG. 10 is a view illustrating an environment of a plurality of source devices according to an embodiment of the disclosure.

FIG. 10 is a view illustrating an environment of a plurality of source devices according to an embodiment of the disclosure.

Various examples have been described centering on the electronic device 201 and the external electronic device 202 with reference to FIGS. 2 to 9, but the embodiments described herein may be applied even in an environment in which a plurality of source devices (e.g., the electronic device 201 of FIG. 2 or 3) are present.

Referring to FIG. 10, a plurality of source devices UE1, UE2, UE3, UE4, and UE5 may be present. Upon receiving an advertisement (e.g., the first advertisement received in operation 910 of FIG. 9) from the external electronic device 202, each of the plurality of source devices UE1, UE2, UE3, UE4, and UE5 may determine whether it has ever been connected to the external electronic device 202. For example, if a source device (e.g., the electronic device 201 of FIG. 2 or FIG. 3) has ever been connected to the external electronic device 202, the source device may store the address of the external electronic device 202 (e.g., operation 815 of FIG. 8). The source device may be configured to transmit a response signal (e.g., the second advertisement received in operation 915 of FIG. 9) only if the address of the external electronic device 202 included in the advertisement signal corresponds to the stored address.

In the example of FIG. 10, the UE1 and UE2 are source devices that have ever been connected to the external electronic device 202, and the UE3, UE4, and UE5 may never have been connected to the external electronic device 202. The UE1 and UE2 may transmit an advertisement signal in response to receiving the advertisement from the external electronic device 202. The UE3, UE4, and UE5 may ignore the advertisement signal of the external electronic device 202 and may not transmit the advertisement signal. By the UE3, UE4, and UE5 not transmitting the advertisement signal, interference between a plurality of source devices UE1, UE2, UE3, UE4, and UE5 may be reduced.

The external electronic device 202 may display a selection menu 1010 for the UE1 and a selection menu 1020 for the UE2, from which the advertisement signal has been received.

With reference to FIG. 10, the external electronic device 202 has been described as displaying selection menus 1010 and 1020 based on reception of the advertisement signal, but embodiments disclosed herein are not limited thereto. According to an embodiment of the disclosure, the external electronic device 202 may display a selection menu for electronic devices having a connection history. For example, even if the advertisement signal is not received from the UE2, the external electronic device 202 may display the selection menu 1020 for the UE2 having the connection history. If an input for selecting the UE2 from which the advertisement signal has not been received is received, the external electronic device 202 may attempt access to the UE2. While attempting to connect, the external electronic device 202 may display information about the progress of the connection. The external electronic device 202 may attempt to access the UE2 until the connection is successful, for a specified period of time, or for a specified number of times. In an example, the external electronic device 202 may temporarily deactivate the selection menu 1020 for the UE2 if access to the UE2 fails.

Figure 11:
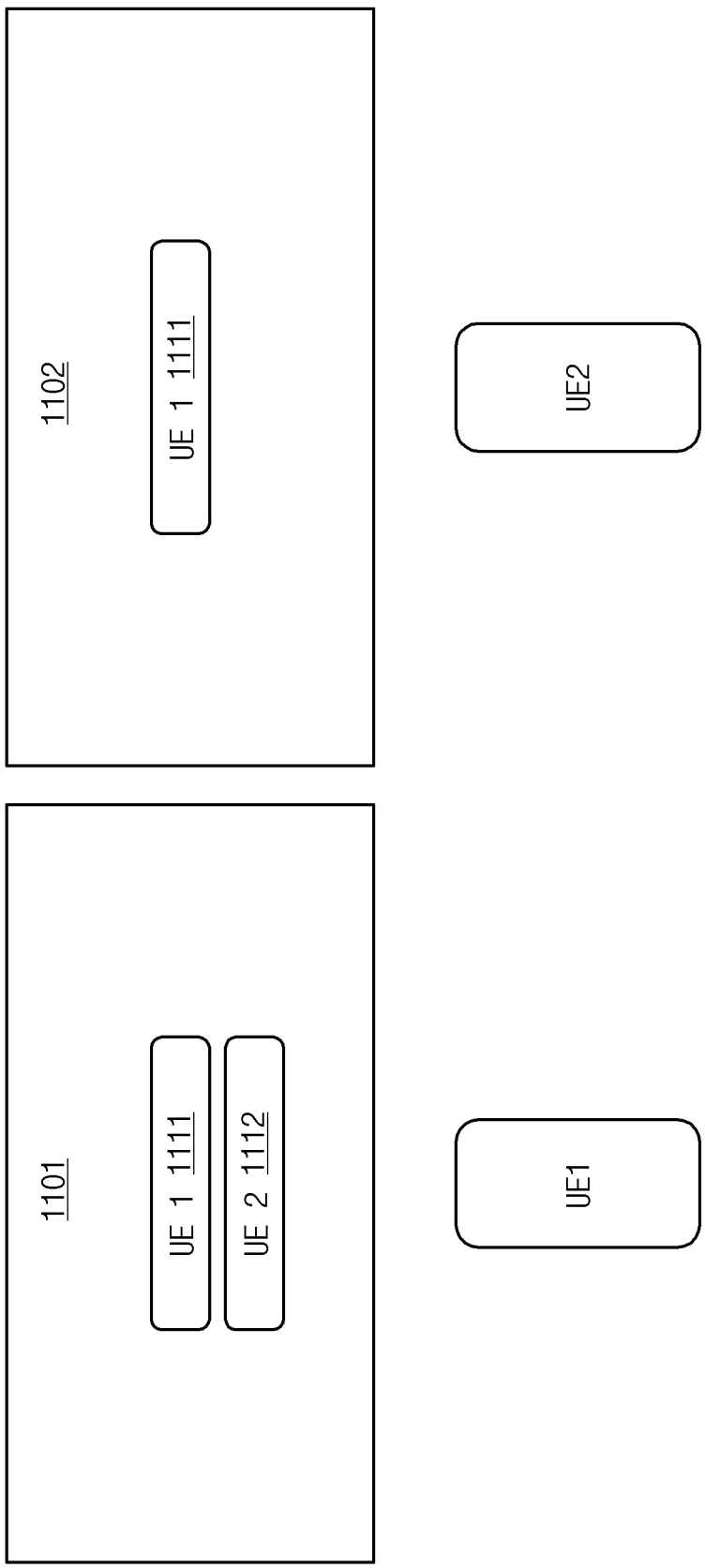
FIG. 11 is a view illustrating an environment of a plurality of electronic devices according to an embodiment of the disclosure.

FIG. 11 is a view illustrating an environment of a plurality of electronic devices according to an embodiment of the disclosure.

Referring to FIG. 11, a plurality of source devices UE1 and UE2 and a plurality of client devices 1101 and 1102 may be present. The source device may refer to a device providing a service for sharing multimedia data, that is, the electronic device 201 of FIG. 2 or 3. The client device may refer to the external electronic device 202 of FIG. 3 receiving a service for sharing multimedia data. For example, the first client device 1101 and the second client device 1102 may transmit an advertisement signal (e.g., the first advertisement received in operation 910 of FIG. 9). The UE1 is a device that has ever been connected to both the first client device 1101 and the second client device 1102, and may transmit an advertisement signal (e.g., the second advertisement received in operation 915 of FIG. 9) in response to advertisement signals of the first client device 1101 and the second client device 1102. The UE2 is a device that has only ever been connected to the first client device 1101 and may respond only to the advertisement signal of the first client device 1101.

The first client device 1101 may display a selection menu 1111 for the UE1 based on the advertisement signal of the UE1 and display a selection menu 1112 for the UE2 based on the advertisement signal of the UE2. The second client device 1102 may display the selection menu 1111 for the UE1 based on the advertisement signal of the UE 1.

For example, the UE1 may receive connection requests from the first client device 1101 and the second client device 1102. In this case, the UE1 may be connected to the client device that has transmitted the connection request first. While the UE1 is connected to one client device, the UE1 may not be connected to another client device (e.g., the second client device 1102). After the connection to the existing client device (e.g., the first client device 1101) is ended, the UE1 may be connected to another client device (e.g., the second client device 1102).

Figure 12:
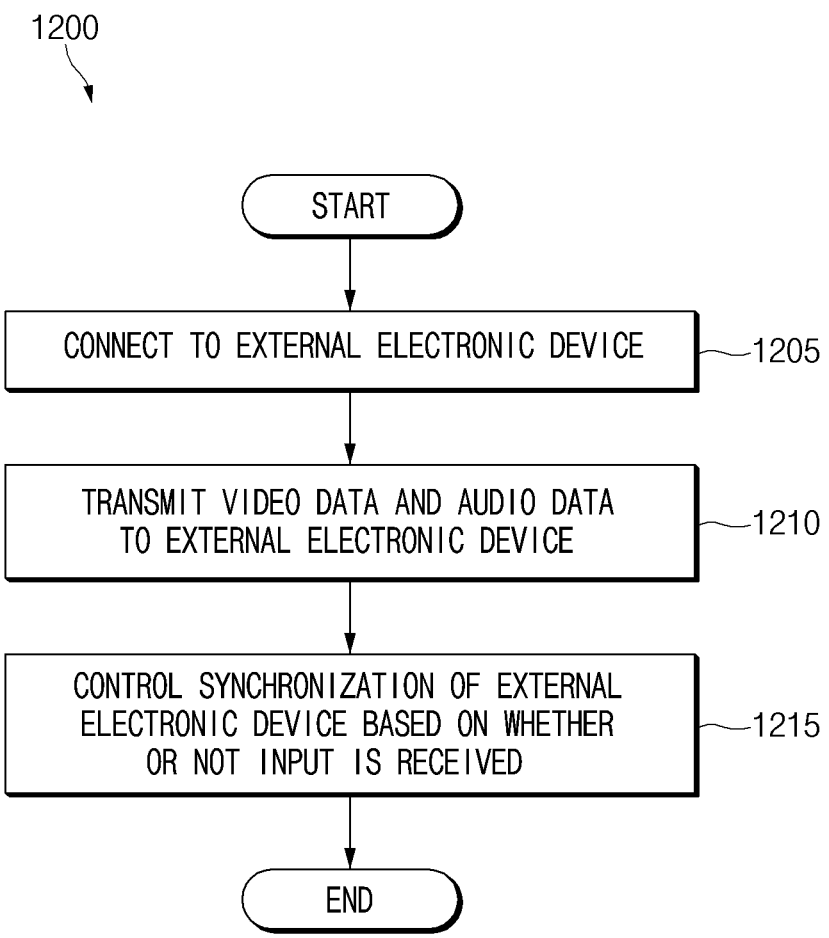
FIG. 12 is a flowchart of a method for controlling synchronization of an electronic device according to an embodiment of the disclosure.

FIG. 12 is a flowchart of a method 1200 for controlling synchronization of an electronic device according to an embodiment of the disclosure.

Referring to FIG. 12, it may be performed by a processor (e.g., the processor 120 of FIG. 1 or the processor 320 of FIG. 3) of an electronic device (e.g., the electronic device 101 of FIG. 1 or the electronic device 201 of FIGS. 2 and 3) and a processor (e.g., the processor 321 of FIG. 3) of an external electronic device (e.g., the external electronic device 202 of FIG. 3).

In operation 1205, the electronic device 201 may connect to the external electronic device 202. For example, the electronic device 201 may connect to the external electronic device 202 based on the first protocol. The electronic device 201 may recognize and connect to the external electronic device 202 according to the connection method described above with reference to FIG. 8 or FIG. 9.

In operation 1210, the electronic device 201 may transmit video data and audio data (e.g., multimedia data) to the external electronic device 202. As described above with reference to FIGS. 2 and 3, multimedia data may include video data and audio data corresponding to a virtual execution environment or mirroring.

In operation 1215, the electronic device 201 may control synchronization of the external electronic device 202 based on whether or not an input is received. For example, the electronic device 201 may transmit, to the external electronic device 202, a signal indicating synchronization stop of the external electronic device 202 for video data and audio data when a user input related to multimedia data is received. Operation 1215 may be referred to in relation to the method for controlling synchronization in FIG. 13.

Figure 13:
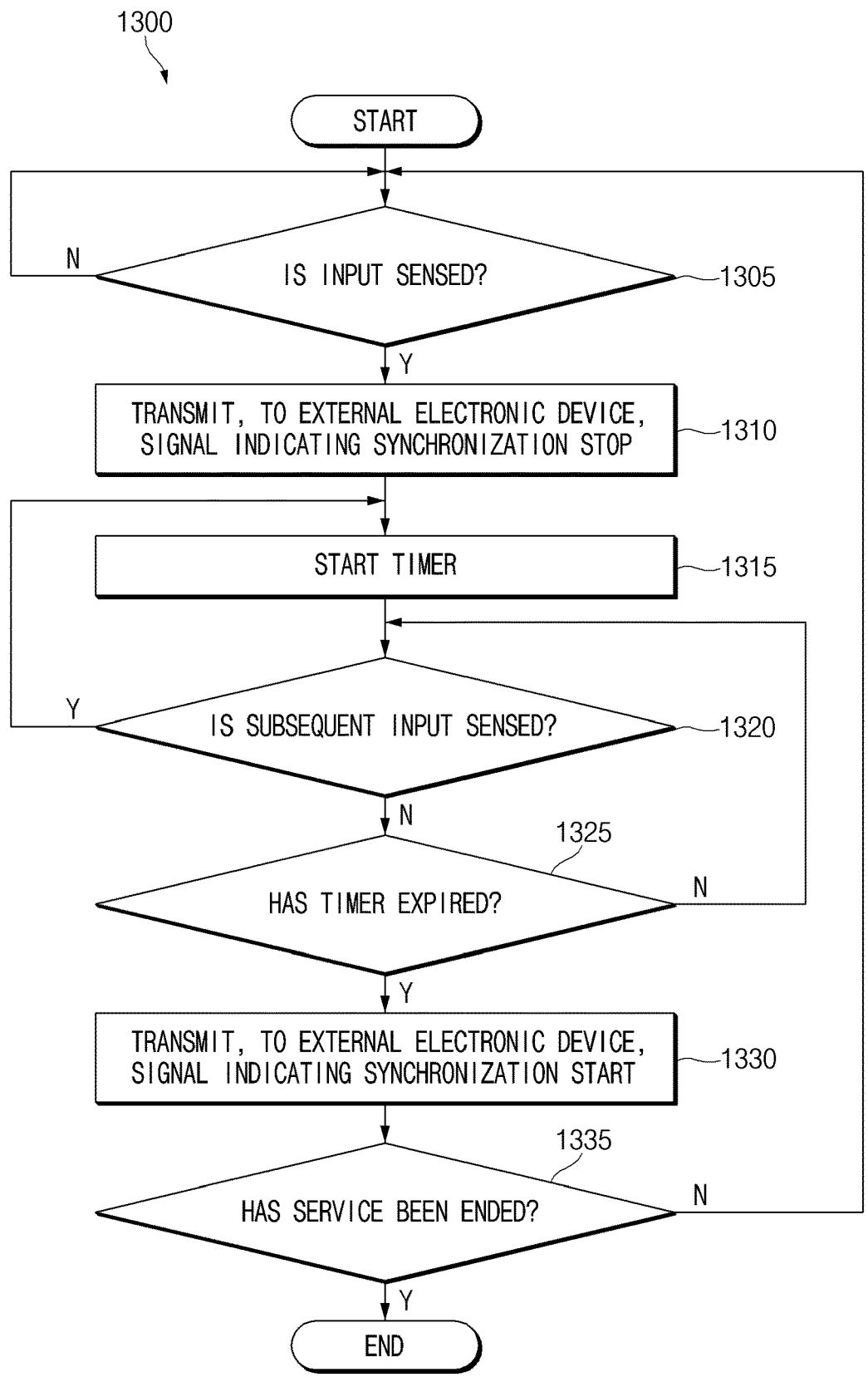
FIG. 13 is a flowchart of a method for controlling synchronization of an electronic device according to an embodiment of the disclosure.

FIG. 13 is a flowchart of a method 1300 for controlling synchronization of an electronic device according to an embodiment of the disclosure.

Referring to FIG. 13, it may be performed by a processor (e.g., the processor 120 of FIG. 1 or the processor 320 of FIG. 3) of an electronic device (e.g., the electronic device 101 of FIG. 1 or the electronic device 201 of FIGS. 2 and 3) and a processor (e.g., the processor 321 of FIG. 3) of an external electronic device (e.g., the external electronic device 202 of FIG. 3).

For example, the electronic device 201 may perform the method of FIG. 13 for controlling synchronization while sharing multimedia data with the external electronic device 202.

In operation 1305, the electronic device 201 may determine whether an input is sensed. The electronic device 201 may sense the input by receiving an input from the electronic device 201, the external electronic device 202, or an external input device. For example, the electronic device 201 may sense an input by receiving an input from a mouse or a keyboard, connected to the electronic device 201 or the external electronic device 202, or a touchpad, a touch sensor, or a stylus pen of the electronic device 201. If the input is not sensed (No in operation 1305), the electronic device 201 may continuously monitor whether an input is received. The electronic device 201 may stop input monitoring if the multimedia sharing service is ended.

If an input is detected (Yes in operation 1305), in operation 1310, the electronic device 201 may transmit, to the external electronic device 202, a signal indicating synchronization stop. The external electronic device 202 may stop synchronization of video data and audio data if the signal indicating synchronization stop is received.

In operation 1315, the electronic device 201 may start a timer. In operation 1320, the electronic device 201 may determine whether a subsequent input is sensed. If the subsequent input is sensed (Yes in operation 1320), the electronic device 201 may start (e.g., update) the timer again. That is, the timer may be continuously updated whenever an input is received before the timer expires. If no subsequent input is sensed (No in operation 1320), in operation 1325, the electronic device 201 may determine whether the timer has expired. If the timer has not expired (No in operation 1325), the electronic device 201 may continuously monitor a subsequent input. If the timer has expired (Yes in operation 1325), in operation 1330, the electronic device 201 may transmit, to the external electronic device 202, a signal indicating synchronization start. The external electronic device 202 may resume synchronization when the signal indicating synchronization start is received.

In operation 1335, the electronic device 201 may determine whether the service for sharing multimedia data has been ended. If the service has been ended (Yes in operation 1335), the electronic device 201 may stop input-based synchronization control. If the service has not been ended (No in operation 1335), the electronic device 201 may continuously monitor an input.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a wireless communication circuit;
at least one processor; and
memory connected to the at least one processor,
wherein the memory stores one or more computer programs including computer-executable instructions that, when executed by the at least one processor, cause the electronic device to:
connect to an external electronic device by using the wireless communication circuit, and
based on the connecting to the external electronic device, transmit audio data and video data for playing multimedia in the external electronic device by using the wireless communication circuit, and
wherein the one or more computer programs further include computer-executable instructions that, when executed by the at least one processor, cause the electronic device to, while transmitting the audio data and the video data:
obtain an input moving a pointer for the multimedia, and
in response to obtaining the input, transmit, to the external electronic device, information to control the external electronic device to output the audio data and the video data without synchronization between the audio data and the video data to reduce an input lag from the synchronization.

2. The electronic device of claim 1, wherein the multimedia corresponds to mirroring of a display screen of the electronic device or a virtual execution environment provided by the electronic device.

3. The electronic device of claim 2, wherein the input for the multimedia includes an input for mirrored execution environment of the electronic device or an input for the virtual execution environment.

4. The electronic device of claim 3, wherein the one or more computer programs further include computer-executable instructions that, when executed by the at least one processor, cause the electronic device to:
sense the input for the multimedia based on an input for the electronic device or an input for the external electronic device.

5. The electronic device of claim 3, wherein the one or more computer programs further include computer-executable instructions that, when executed by the at least one processor, cause the electronic device to:
in response to obtaining the input, start a timer.

6. The electronic device of claim 5, wherein the one or more computer programs further include computer-executable instructions that, when executed by the at least one processor, cause the electronic device to:
in response to obtaining a subsequent input for the multimedia while the timer is running, restart the timer, and
in response to the timer expiring, transmit, to the external electronic device, a signal to resume synchronization between the audio data and the video data.

7. The electronic device of claim 3, wherein the one or more computer programs further include computer-executable instructions that, when executed by the at least one processor, cause the electronic device to:
receive, from the external electronic device, a first advertisement signal based on a second protocol, and
based on an address of the external electronic device indicated by the first advertisement signal corresponding to an address stored in the memory, transmit a second advertisement signal corresponding to the first advertisement signal.

8. The electronic device of claim 7, wherein the one or more computer programs further include computer-executable instructions that, when executed by the at least one processor, cause the electronic device to:
based on a connection request being received from the external electronic device by using the second protocol, connect to the external electronic device using a first protocol by the wireless communication circuit.

9. The electronic device of claim 3, wherein the one or more computer programs further include computer-executable instructions that, when executed by the at least one processor, cause the electronic device to:
transmit the audio data and the video data based on a real-time transport protocol (RTP).

10. The electronic device of claim 9, wherein each of the audio data and the video data includes time information in a header.

11. A method for controlling synchronization of an electronic device, the method comprising:
connecting to an external electronic device;
based on the connecting to the external electronic device, transmitting, to the external electronic device, audio data and video data for playing multimedia in the external electronic device; and
controlling synchronization of the external electronic device during transmission of the audio data and the video data,
wherein the controlling of the synchronization includes:
while transmitting the audio data and the video data, obtaining, by the electronic device, an input moving a pointer for the multimedia, and
in response to obtaining the input, transmitting, to the external electronic device during the transmitting of the audio data and the video data, information to control the external electronic device to output the audio data and the video data without synchronization between the audio data and the video data to reduce an input lag from the synchronization.

12. The method of claim 11, wherein the multimedia corresponds to mirroring of a display screen of the electronic device or a virtual execution environment provided by the electronic device.

13. The method of claim 12, wherein the input for the multimedia includes an input for mirrored execution environment of the electronic device or an input for the virtual execution environment.

14. The method of claim 13, wherein the obtaining of the input includes sensing the input based on an input for the electronic device or an input for the external electronic device.

15. The method of claim 13, further comprising:
in response to obtaining the input, starting a timer.

16. The method of claim 15, further comprising:
in response to obtaining a subsequent input for the multimedia while the timer is running, restarting the timer; and
in response to the timer expiring, transmitting, to the external electronic device, a signal to resume synchronization between the audio data and the video data.

17. The method of claim 13, further comprising:
receiving, from the external electronic device, a first advertisement signal based on a second protocol; and
based on an address of the external electronic device indicated by the first advertisement signal corresponding to an address stored in memory of the electronic device, transmitting a second advertisement signal corresponding to the first advertisement signal.

18. The method of claim 17, further comprising:
based on a connection request being received from the external electronic device by using the second protocol, connecting to the external electronic device using a first protocol.

19. The method of claim 11, wherein the transmitting of the audio data and the video data comprises transmitting the audio data and the video data based on a real-time transport protocol (RTP).

20. The method of claim 19, wherein each of the audio data and the video data includes time information in a header.

21. The electronic device of claim 1, wherein the information to control the external electronic device includes information to sequentially output audio data and video data stored in a data buffer without synchronizing the audio data and the video data.

22. One or more non-transitory computer-readable storage media storing one or more computer programs including computer-executable instructions that, when executed by one or more processors of an electronic device, cause the electronic device to perform operations, the operations comprising:
connecting to an external electronic device;
based on the connecting to the external electronic device, transmitting, to the external electronic device, audio data and video data for playing multimedia in the external electronic device; and
controlling synchronization of the external electronic device during transmission of the audio data and the video data,
wherein the controlling of the synchronization includes:
while transmitting the audio data and the video data, obtaining an input moving a pointer for the multimedia, and
in response to obtaining the input, transmitting, to the external electronic device during the transmitting of the audio data and the video data, information to control the external electronic device to output the audio data and the video data without synchronization between the audio data and the video data to reduce an input lag from the synchronization.

* * * * *